United States Patent
Roberts et al.

(10) Patent No.: US 11,103,913 B2
(45) Date of Patent: Aug. 31, 2021

(54) METHODS AND SYSTEMS FOR JACKET JOINTS

(71) Applicant: JOHNS MANVILLE, Denver, CO (US)

(72) Inventors: James Martin Roberts, Houston, TX (US); Johnny Dale Angel, Houston, TX (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/565,177

(22) Filed: Sep. 9, 2019

(65) Prior Publication Data
US 2019/0388955 A1  Dec. 26, 2019

Related U.S. Application Data

(63) Continuation of application No. 14/132,763, filed on Dec. 18, 2013, now abandoned.

(51) Int. Cl.
| | |
|---|---|
| *B21D 49/00* | (2006.01) |
| *B21D 47/04* | (2006.01) |
| *B32B 1/08* | (2006.01) |
| *B32B 7/06* | (2019.01) |
| *B32B 7/10* | (2006.01) |
| *B32B 15/08* | (2006.01) |
| *F16L 59/16* | (2006.01) |
| *F16L 59/10* | (2006.01) |
| *F16L 59/22* | (2006.01) |

(52) U.S. Cl.
CPC .......... *B21D 49/005* (2013.01); *B21D 47/04* (2013.01); *B32B 1/08* (2013.01); *B32B 7/06* (2013.01); *B32B 7/10* (2013.01); *B32B 15/08* (2013.01); *F16L 59/103* (2013.01); *F16L 59/106* (2013.01); *F16L 59/168* (2013.01); *F16L 59/22* (2013.01); *Y10T 29/49812* (2015.01); *Y10T 29/49885* (2015.01)

(58) Field of Classification Search
CPC ................................ F16L 59/14; F16L 59/143
USPC ........................................................ 138/149
See application file for complete search history.

(56) References Cited

U.S. PATENT DOCUMENTS

| | | | | |
|---|---|---|---|---|
| 1,814,134 A | * | 7/1931 | Eige ........................ | F16L 59/16 138/140 |
| 2,082,175 A | * | 6/1937 | Sutherland .............. | F16L 58/02 138/145 |
| 3,078,880 A | * | 2/1963 | Joseph ................... | F16L 59/026 138/141 |
| 3,153,546 A | * | 10/1964 | Dunn ...................... | F16L 59/11 285/13 |
| 3,559,694 A | * | 2/1971 | Berg ....................... | F16L 59/16 138/147 |
| 4,810,542 A | * | 3/1989 | Kawai ..................... | B32B 1/02 428/36.7 |
| 4,830,060 A | * | 5/1989 | Botsolas ............... | F16L 59/161 137/375 |

(Continued)

*Primary Examiner* — Vishal Pancholi
(74) *Attorney, Agent, or Firm* — Robert D. Touslee

(57) ABSTRACT

A system comprising a protective jacket for insulating pipe is provided. The protective jacket comprises a first metal shell comprising an interior surface and an exterior surface, wherein the interior surface comprises a moisture protective coating, and the exterior surface comprises a film adhered to the exterior surface by an adhesive, and wherein the adhesive provides for a toolless removal of the film.

21 Claims, 8 Drawing Sheets

(56) References Cited

U.S. PATENT DOCUMENTS

| | | | | |
|---|---|---|---|---|
| 6,000,420 | A * | 12/1999 | Nicholson | F16L 59/16 |
| | | | | 137/15.01 |
| 6,840,283 | B2 * | 1/2005 | Furugen | F02M 55/005 |
| | | | | 123/468 |
| 7,360,799 | B1 * | 4/2008 | Price | F16L 59/22 |
| | | | | 138/149 |
| 8,568,844 | B2 * | 10/2013 | Whitaker | F16L 59/029 |
| | | | | 428/36.4 |
| 2003/0011163 | A1 * | 1/2003 | Coomber | B60R 3/002 |
| | | | | 280/163 |
| 2007/0126201 | A1 * | 6/2007 | Crandall | B60R 3/002 |
| | | | | 280/163 |
| 2008/0206543 | A1 * | 8/2008 | Whitaker | C04B 28/26 |
| | | | | 428/304.4 |
| 2009/0250136 | A1 * | 10/2009 | Roberts | B32B 27/308 |
| | | | | 138/143 |
| 2010/0156091 | A1 * | 6/2010 | Boncalo | F16L 59/22 |
| | | | | 285/47 |

* cited by examiner

METHODS AND SYSTEMS FOR JACKET JOINTS

BACKGROUND

The present disclosure relates generally to methods and systems for improved metal insulation jacket joints.

A wide range of industrial, commercial, residential and other applications may provide for conduits (e.g., pipes) insulated with fiberglass or other materials. The insulated conduits may then be covered in a protective jacket for preserving and protecting the insulation material and underlying conduits. In linear conduits, the protection may entail wrapping the conduit with a protective material, such as aluminum sheeting. In angled or bent conduits (e.g., elbow joints), aluminum sheeting may also be used but, because of the angled geometry, it may be beneficial to use aluminum sheeting having a geometry that more comformably follows the angles of the conduit, such as jacket joints. Similar jacket joints may be used for tee (e.g., "T") junctions.

The jacket joints may include two symmetrical metal portions (e.g., "shells") that may follow a desired angled geometry (e.g., 90° elbow). The two shells may be placed opposite each other and covering a desired angled conduit. The shells may then be secured in place, for example, by screws, by securing the shells with one or more metal bands or strips, and/or by using other fastening techniques. The installed shells may then provide protection against external elements (e.g., dust, fluids, and so forth), inadvertent contact, and so forth, of the conduit and its overlaying insulation. It may be useful to improve the manufacture and installation of jacket joints.

BRIEF DESCRIPTION

Present embodiments are designed to respond to such a need. In accordance with a first embodiment, a system comprising a protective jacket for insulating pipe is provided. The protective jacket comprises a first metal shell comprising an interior surface and an exterior surface, wherein the interior surface comprises a moisture protective coating, and the exterior surface comprises a film adhered to the exterior surface by an adhesive, and wherein the adhesive provides for a toolless removal of the film.

In another embodiment, method for manufacturing a protective jacket for insulating pipe is provided. The method comprises manufacturing a first metal shell. The manufacturing the first metal shell includes applying a moisture protecting coating to a first surface of a metal sheet and applying a film to a second surface of the metal sheet by using an adhesive, wherein the adhesive provides for a toolless removal of the film. The manufacturing the first metal shell additionally includes forming the metal sheet into a shape configured to follow contours of the pipe.

In a further embodiment, a method for manufacturing a protective jacket for insulating pipe comprises manufacturing a first metal shell. The manufacturing the first metal shell includes applying a moisture protecting coating to a first surface of a metal sheet and applying a film to a second surface of the metal sheet by using an adhesive, wherein the adhesive provides for a toolless removal of the film. The manufacturing the first metal shell additionally includes using a male and a female mold to form the metal sheet into a shape configured to follow contours of the pipe by press or punch molding.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure provides improvements to the manufacturing and installation of jacket joints. The techniques described herein are based upon the use of a single- or multi-layered protective sheet disposed on an exterior surface of shell portions suitable for protecting sheet metal during jacket manufacturing and installation. By disposing the protective sheet on the exterior surface, the jacket may be manufactured without applying an external coating (e.g., paint), thus improving manufacturing time and decreasing cost. Before (or during) installation of the jacket onto the conduit, the protective sheet may be removed, for example, by hand, leaving a substantially scratch-free outer surface. Indeed, toolless removal of the protective sheet is provided, thereby improving installation times. In certain embodiments, the use of metal that is galvanically compatible with linear conduits is also provided. That is, the angled conduit (e.g., elbow joint) may be coupled to a linear conduit (e.g., straight pipe) so that the resulting combination includes a metal composition that minimizes or eliminates galvanic corrosion. In one embodiment, the jacket may include a polymeric coating on an interior surface, such as a multi-layer polysurlyn moisture barrier, particularly useful for minimizing or eliminating corrosion in the interior of the jacket. By providing for an interior polysurlyn-based coating, and exterior protective film coating in lieu of painted coatings, the embodiments described herein may provide for increased operational life with improved manufacturing and installation efficiencies.

Figure 1:
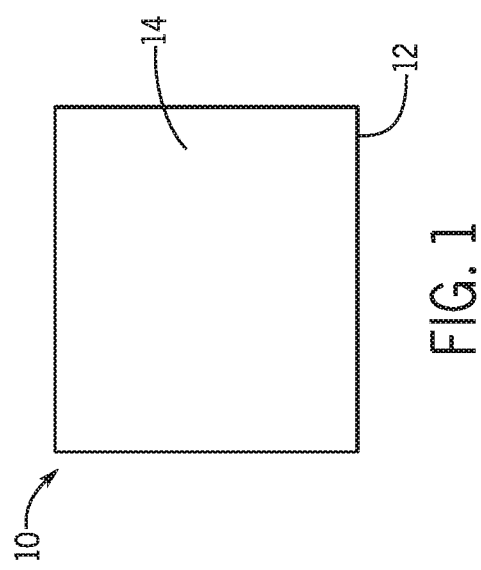
FIG. 1 is a top view of an embodiment of a metal sheet used in manufacturing an insulation jacket.

Turning now to the drawings, and referring first to FIG. 1, an embodiment of a metal plate or sheet 10 used in manufacturing an insulation jacket is shown. Insulating and/or covering linear pipe with metal is relatively simple: a flat metal sheet is wrapped concentrically around the linear cylindrical portion of pipe and secured with a banding (e.g., strap) or fasteners. Linear portions of pipe may be covered with, for example, 1000 or 3000 series aluminum. Protecting the turns and bends in the pipe, such as at angled portions, tees, or elbows, can be difficult, however. Corner or elbow portions of pipes may be covered using softer or more malleable metal to facilitate wrapping around the "bent" portion. However, the use of dissimilar metals may lead to galvanic rusting, and the wrapping may not comformably fit the bends. The techniques described herein provide for metal sheets that may be formed into metal jackets to incorporate desired geometries or bends, and that may use the same metal type used in protecting linear conduits. In certain embodiments, an inner surface 12 may be coated with a thermally protective coating, such as polysurlyn. Accordingly, the inner surface 12 may be disposed facing pipes carrying hot liquids or gases and provide for longer life and increased protection. An outer surface 14 may be protected during manufacturing (and shipping) by using a protective film, as described in more detail below with respect to FIG. 2. Accordingly, an improved insulating jacket joint may be provided.

Figure 2:
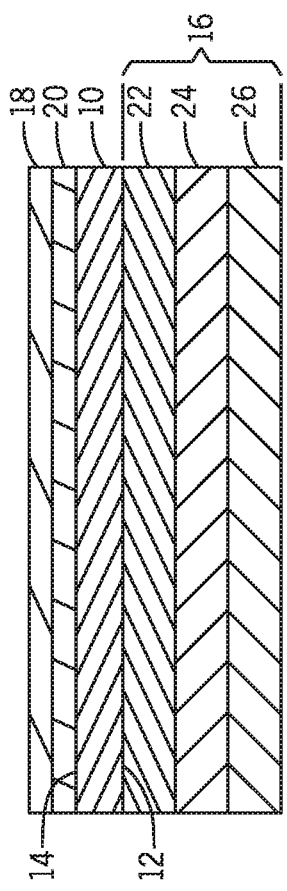
FIG. 2 is a side view of an embodiment of single layer film and a moisture protective coating disposed on the metal sheet of FIG. 1.

FIG. 2 is a side view of the metal sheet 10 of FIG. 1 depicting details of a polysurlyn coating 16 and a film 18 applied, for example, before forming of the metal sheet 10. Before the techniques described herein, the outer surface 14 of the metal sheet 10 may have had a protective coating, such as paint, applied. The paint may then protect the metal sheet 10, for example, from scratches and additional abrasions that may occur during the remainder of the forming process. The techniques described herein replace the protecting coating with the protective film 18. Indeed, the film 18 may be applied in lieu of any coating and may suitably withstand various manufacturing processes, including forming of the metal sheet 10 by using hydraulic presses. Further, the film 18 may be removed manually after manufacturing of the jacket shell without the use of special tools, either before shipping a completed jacket shell or before installation of the jacket shell onto a pipe.

In the depicted embodiment, the film 18 is applied by using an adhesive layer 20. In one embodiment, the film 18 may include a polyethylene, a polypropylene, a plastic, a vinyl, a polymer, or a combination thereof. The adhesive layer 20 may include an adhesive such as acrylic-based adhesives, water-based adhesives, and/or other adhesives that may provide for medium-tack adhesion. These types of adhesives may provide a secure attachment of the film 18 to the sheet 10 but additionally enable substantially all of the adhesive layer 20 to remain with the film 18 when the film 18 is manually removed from the metal sheet 10, for example, by grasping a corner of the film 18 between the thumb and forefinger and pulling outwardly from the metal sheet 10. Accordingly, minimal or almost no cleaning of the outer surface 14 may be needed once the film 18 has been removed.

Figure 3:
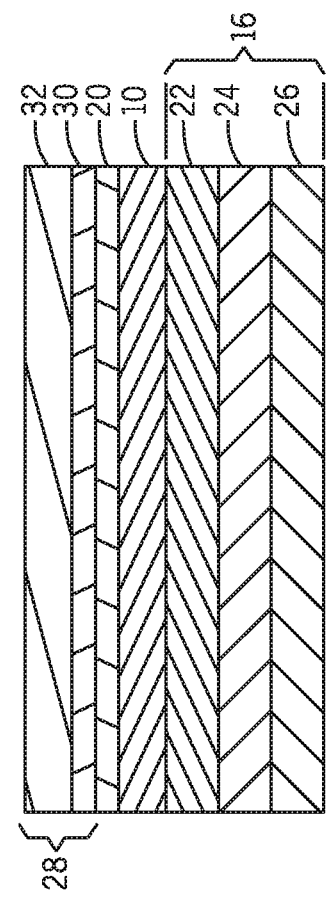
FIG. 3 is a side view of an embodiment of multiple layer film and a moisture protective coating disposed on the metal sheet of FIG. 1.

Also depicted are further details of the polysurlyn coating 16 disposed on the inner surface 12. More specifically, the polysurlyn coating 16 may include a low density polyethylene (LPDE) layer 22, a Surlyn® layer 24, and a high density polyethylene layer 26. The layers 22, 24, 26 may be coextruded and used to provide for protection against pitting, crevice, and/or galvanic corrosion. It is to be understood that the cross sections shown in FIGS. 2 and 3 are not to scale. By way of example only, each of the three layers 22, 24, 26 may have a thickness of approximately 0.5 to approximately 2.5 mils, the metal sheet 10 may have a thickness of between approximately 8 and approximately 30 mils, and the film and adhesive layers may together have a thickness of between approximately 0.5 and approximately 2.5 mils. It is also to be noted that in other embodiments, such as the embodiment shown in FIG. 3, multiple plys of film may be used. For example, FIG. 3 depicts the use of a multiple ply film 28 having a first ply 30 and a second ply 32. Adding multiple plys 30, 32 may provide for improved durability of the film 28 during the manufacturing of the jackets. Because FIG. 3 includes like elements of FIG. 2, the like elements are depicted using like numbers.

Figure 4:
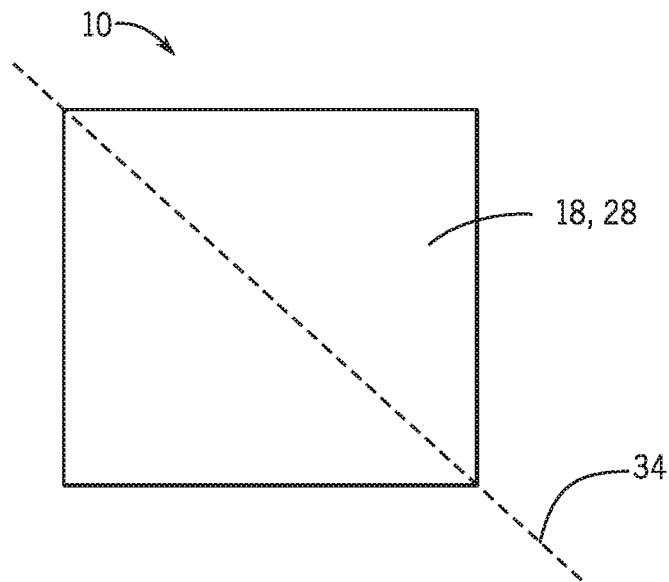
FIG. 4 is a top view of an embodiment of a metal sheet as shown in FIGS. 2 and 3 with a separation line superimposed onto the sheet.
Figure 5:
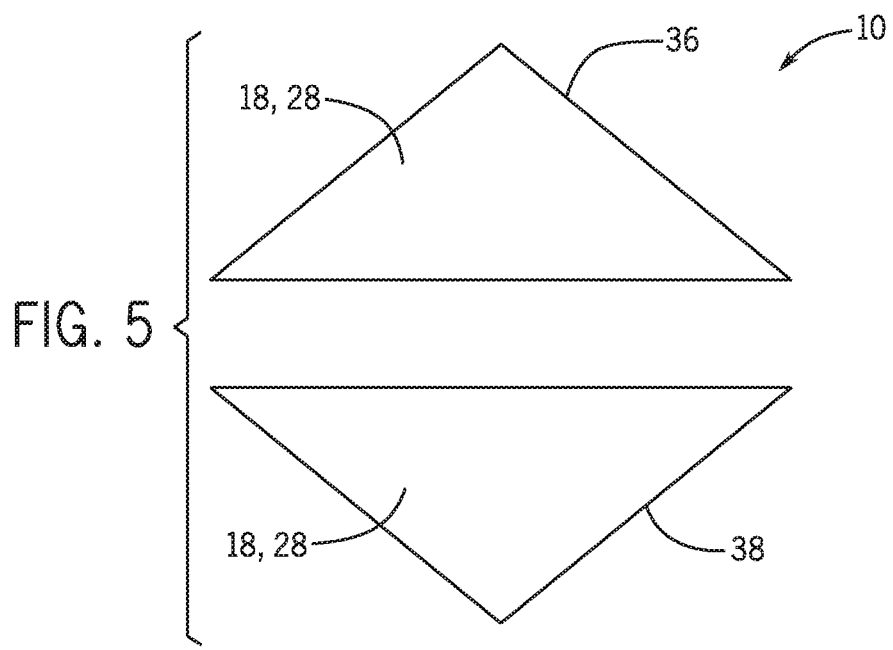
FIG. 5 is a top view of an embodiment of a metal sheet separated into two components.

FIG. 4 is a perspective view of an embodiment of the metal sheet 10 having the protective film 18 or 28 disposed onto the outer surface 14 of the metal sheet 10. As mentioned above, the metal sheet 10 may include the film 18 or 28 suitable for the protection of the metal sheet 10 as it undergoes manufacturing processes. In FIG. 4, a cut line 34 is depicted, useful in cutting or otherwise partitioning the metal sheet 10 into two components as shown in more detail with respect to FIG. 5. Indeed, the metal sheet 10 may be cut into two or more pieces or portions, even when the metal sheet 10 includes the films 18 and/or 28. The films 18 and/or 28 may protect the outer surface 14 of the metal sheet 10 during the cutting operation, reducing or eliminating scratching and marring. A number of techniques may be used to cut the metal sheet 10 into portions 36, 38. For example, rotary cutters, press cutters, metal shears, and so on, may be used to divide the metal sheet 10 into the portions 36, 38. Accordingly, the protective films 18, 28 may provide for protection against scratches, inadvertent abrasions, and inadvertent contact of the metal sheet 10 against undesired surfaces. The portions 36, 38 may then be shaped into a desired geometry, for example, angled geometries and t-shaped geometries as described in more detail below with respect to FIG. 6.

Figure 6:
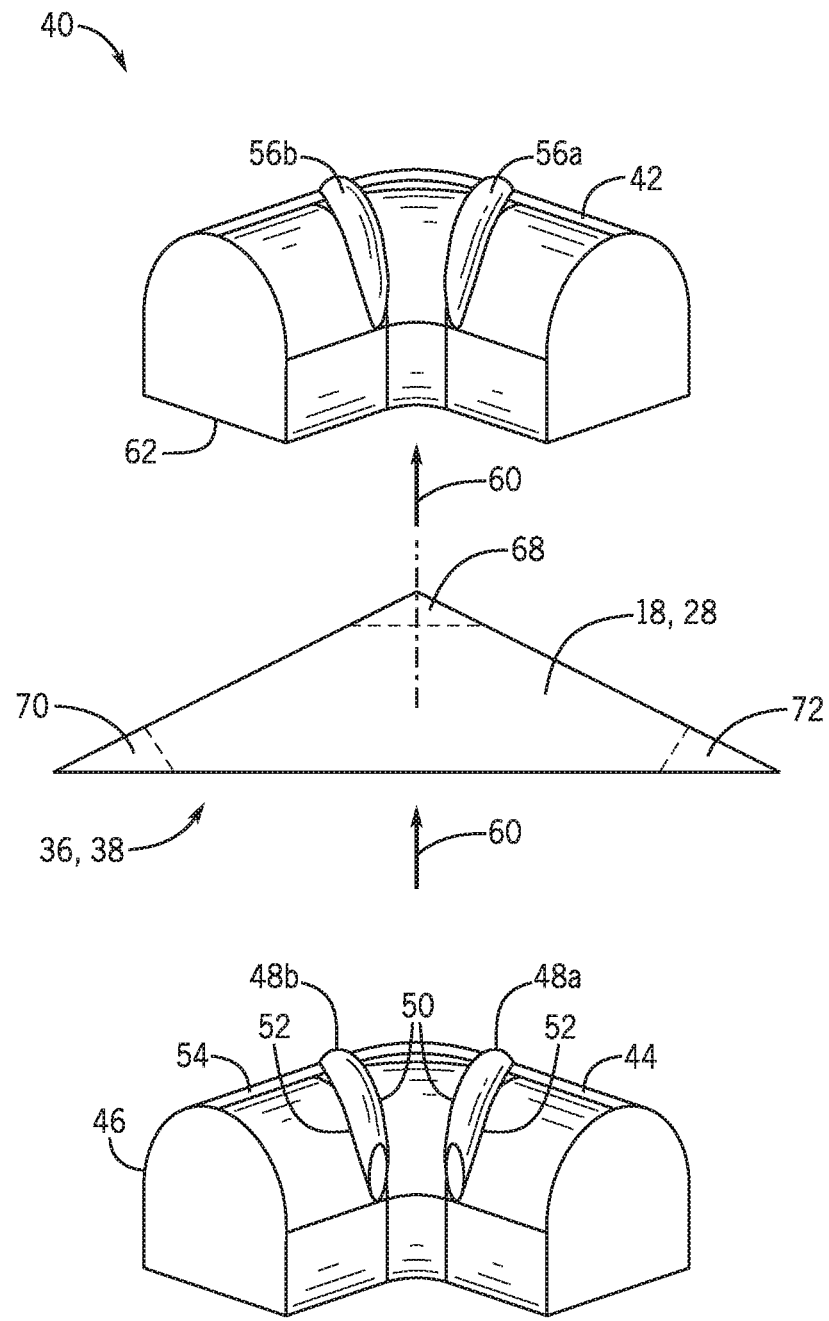
FIG. 6 is a perspective view of embodiments of angled molds used in manufacturing angled insulation jackets.

FIG. 6 is a perspective view of an embodiment of a mold 40 suitable for manufacturing improved insulation jackets having angled geometries. In the depicted embodiment, the mold 40 includes a female mold 42 and a male mold 44. The male mold 44 has a generally semi-circular cross-section 46 and two or more fingers 48a, 48b. In one embodiment, the fingers 48a and 48b may be formed at least 0.5 inches from each other, or between 0.1 and 1.5 inches from each other, for example, to more comfortably provide for angles α. Each of the fingers 48a, 48b may defines fillet-forming areas 50, 52 at a junction of the fingers 48a, 48b and a base 54 of the mold 40. The female mold 42 corresponds to the male mold 44 and may be used to form the improved insulation jacket. For example, the female mold 42 includes receptacles 56a, 56b that may accept the fingers 48a, 48b, respectively, when the male mold 44 is inserted into the female mold 42, for example, in a direction 60.

In one embodiment, each of the portions 36, 38 may be press or punch molded by using the mold 40. The press or punch operation may apply forces of between approximately 0.25 and approximately 1 ton per square foot, or more. For example, each portion 36, 38 may be placed onto the bottom end 62 of the female mold 42 and the male mold 44 may then be pressed in the direction 60 to transform the portions 36, 38 into shells 64, 66, shown in FIG. 7, and excess sections 68, 70, 72 of the portions 36, 38 may be cut off or otherwise removed. The films 18, 28 may protect the outer surface 14 of the metal sheet 10 from marring, scratching, or more generally, undesired surface defacement that may have otherwise occurred during the pressing operation. Indeed, the films 18, 28 may provide for surface defacement protection during the remainder of manufacture of the insulation jackets.

Figure 7:
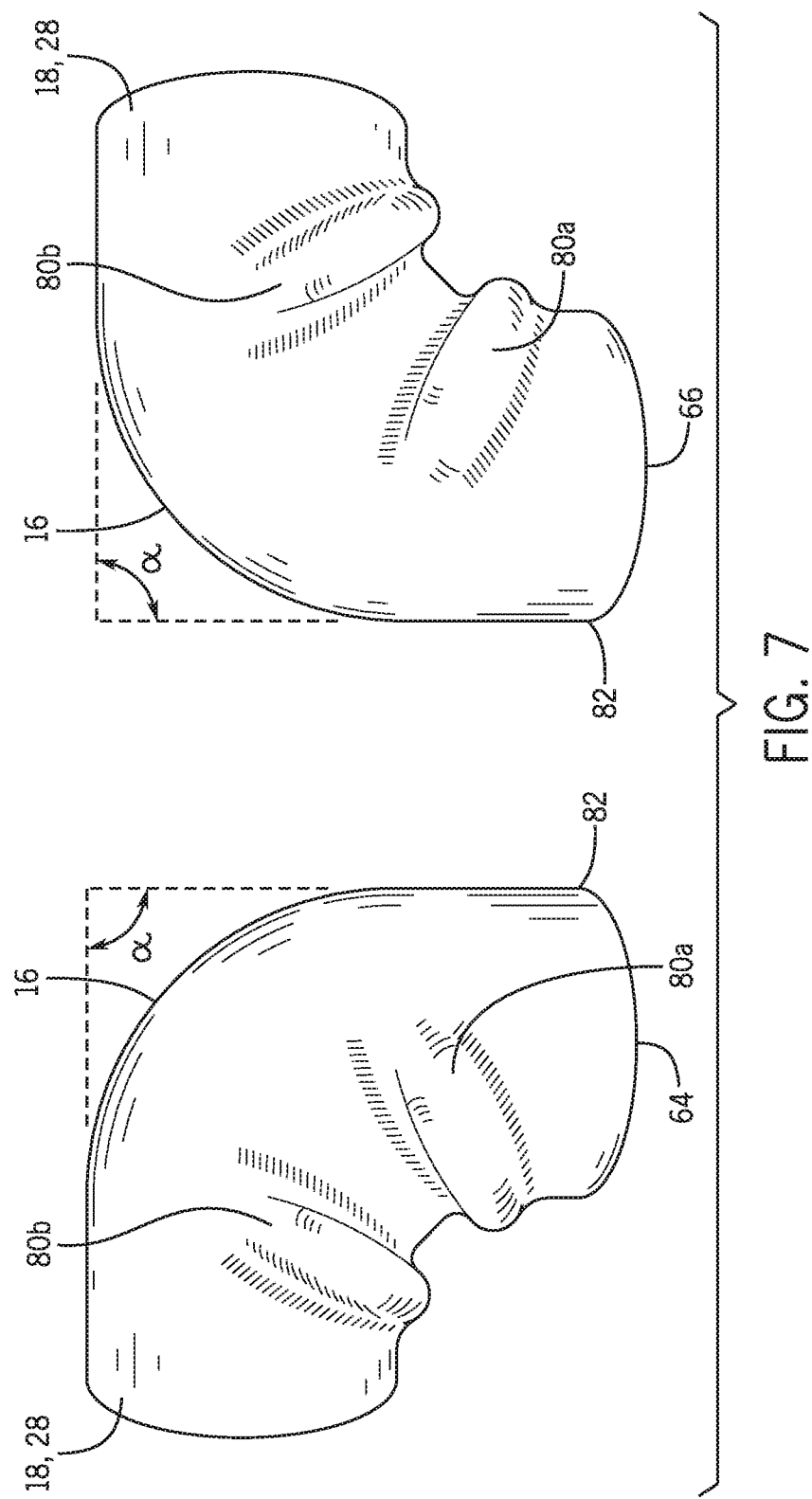
FIG. 7 is a perspective view of embodiments of angled jacket shells.

As shown in FIG. 7, the films 18, 28 may cover the shells 64, 66, including assorted geometric features, including raised ridges 80a, 80b conforming to the fingers 48a, 48b of the mold 40, and an angle α conforming to a desired angle of a bent conduit or pipe (e.g., between approximately 45° and approximately 150°). In one embodiment, the shells 64, 66 may have the films 18 or 28 removed before shipping. For example, a corner 82 of the films 18 and/or 28 may be grasped between the thumb and forefinger and pulled outwardly from the shells 64 and/or 66. Once the films 18 and/or 28 have been removed, the shells 64, 66 may include outer surfaces 14 substantially free of scratches, marring and defacements.

Figure 8:
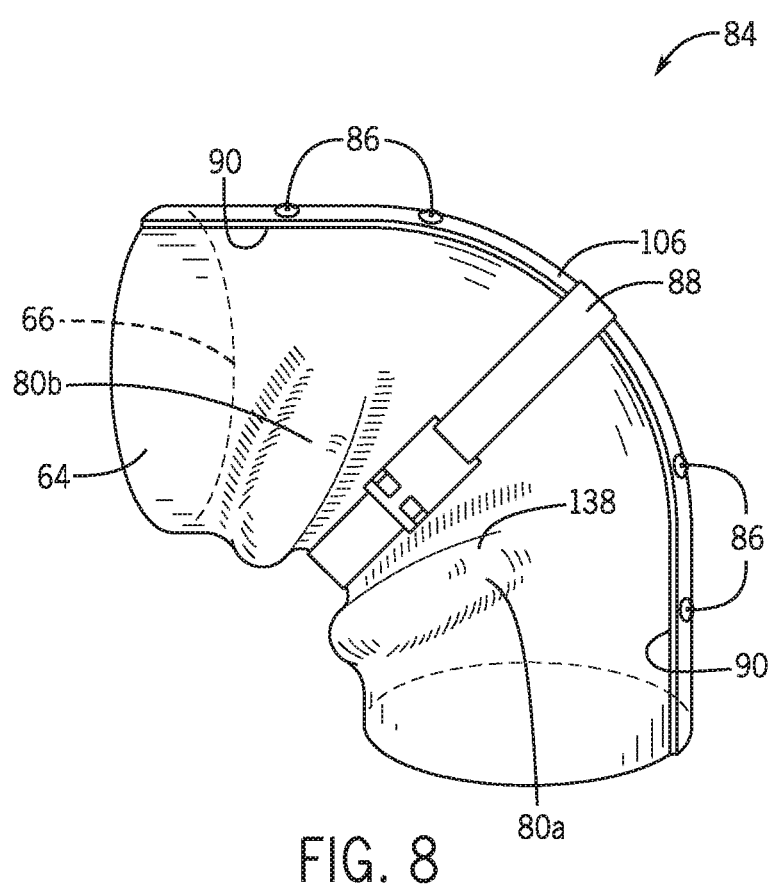
FIG. 8 is a perspective view of an embodiment of an insulation jacket.

It is to be noted that the shells 64, 66 may be shipped with the films 18 and/or 28 still attached. The films 18 and/or 28 may then protect the shells 64, 66 from marring or scratching that may occur during shipment. Once the shells 64, 66 arrive at a desired assembly site, the shells 64, 66 may be used to insulate or otherwise cover an angled conduit, as shown in FIG. 8. More specifically, FIG. 8 depicts a perspective view of an assembled insulation jacket 84 having raised ridges 80a, 80b after assembly of the shells 64, 66.

In the depicted embodiment of FIG. 8, the shells 64, 66 are shown secured to each other using fasteners 86 and a strap 88. More specifically, the shell 66 is shown as overlapping the shell 64, thus resulting in a generally gapless seam 90. It is to be understood that, in other embodiments, the shell 64 may overlap the shell 66. The strap 88 may be manufactured to be compatible with the jacket 84 material so as to minimize or eliminate galvanic corrosion. Accordingly, the strap 88 may be manufactured from plastics, fiber-reinforced material (e.g., carbon fiber), and/or the same metal composition used in manufacturing the shells 64, 66. The techniques described herein may be used to manufacture other jacket types, such as tee junction jackets described in more detail below with respect to FIG. 9.

Figure 9:
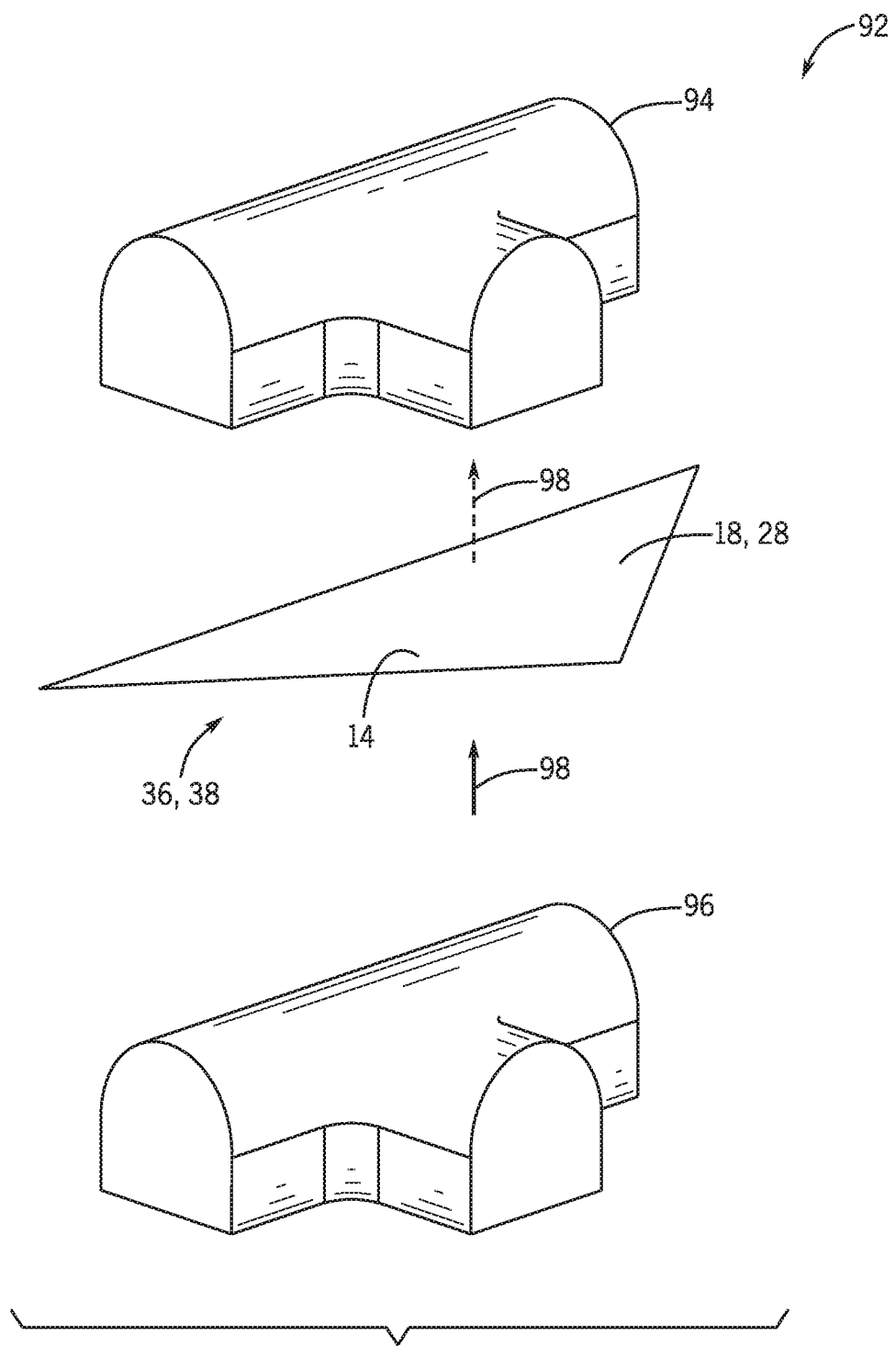
FIG. 9 is a perspective view of embodiments of molds used in manufacturing tee-junction insulation jackets.

FIG. 9 is a perspective view of a mold 92 having a female mold 94 and a male mold 96 suitable for manufacturing tee-junction jackets. As mentioned above with respect to the mold 40 described in FIG. 6, the films 18, 28 may protect the outer surface 14 of the metal sheet 10 from marring, scratching, or more generally, undesired surface defacement that may have otherwise occurred during mold pressing or punch molding operations. For example, a portion 36 or 38 may be disposed so that the male mold 96 is pressed or punched onto the female mold 94 in a direction 98. The press or punch operation may apply forces of between approximately 0.25 and approximately 1 ton per square foot or more, and the films 18, 28 may suitably protect the portions 36, 38 from undesired marring and scratching. Once molded, the portions 36, 38 may more suitably conform to tee-junction shapes, as depicted in FIG. 10.

Figure 10:
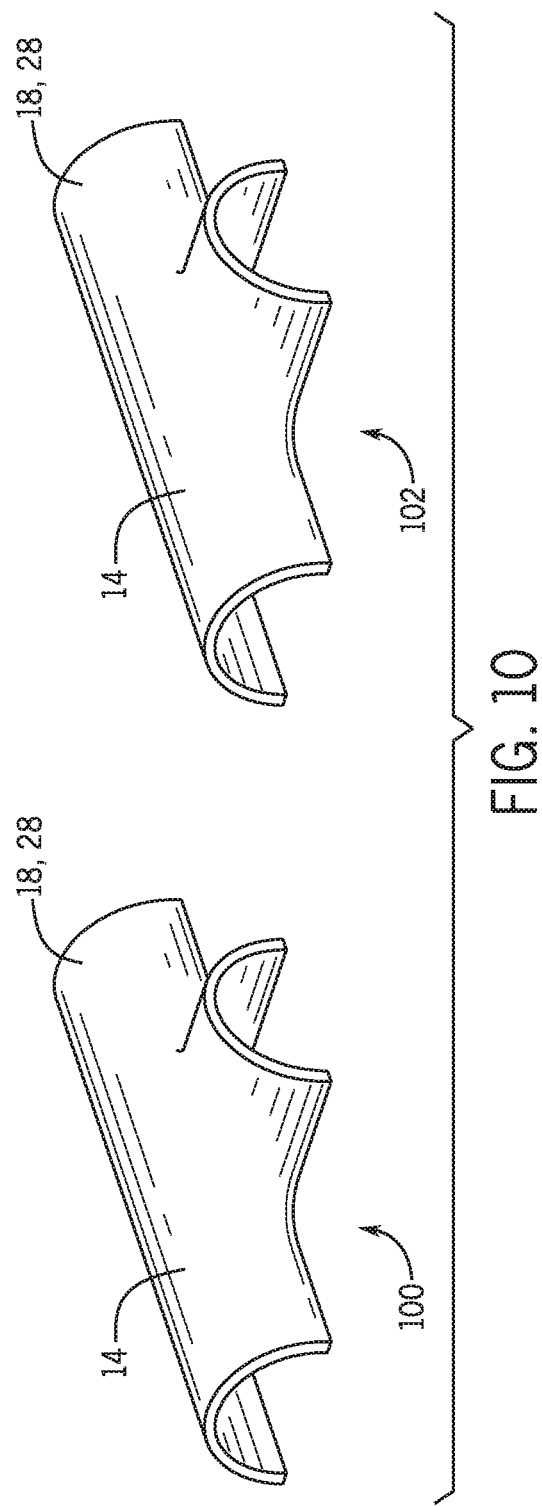
FIG. 10 is a perspective view of embodiments of tee-junction jacket shells.
Figure 11:
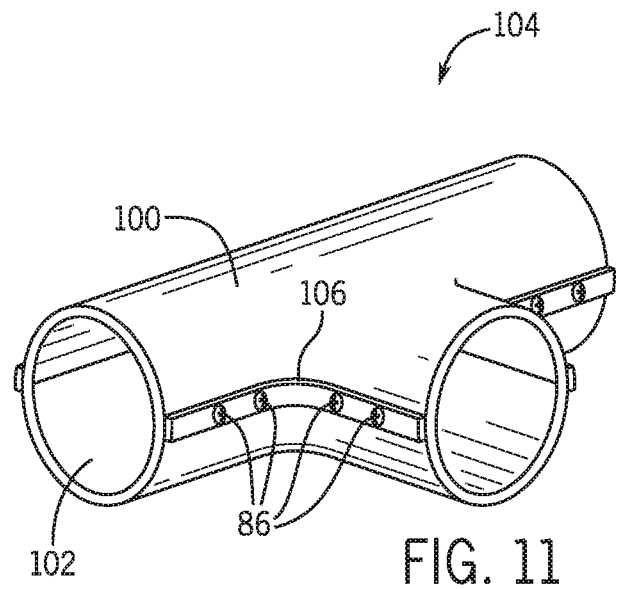
FIG. 11 is a perspective view of an embodiment of a tee-junction insulation jacket.

FIG. 10 depicts tee-junction shells 100, 102 that may have been manufactured from portions 36, 38 respectively. In the depicted embodiment, the shells 100, 102 may still include the protective films 18 and/or 28. As mentioned above, the protective films 18, 28 may be left disposed onto the shells 100, 102 during the manufacturing process, and may additionally be used to protect the shells 100, 102 during shipment. By using the films 18, 28 during manufacturing of the shells 100, 102, a substantially scratch-free outer surface 14 may be provided. The shells 100, 102 may then be fastened our otherwise joined to each other, as shown in FIG. 11, to manufacture a tee junction jacket 104. In the depicted embodiment, fasteners 86 (e.g., screws) are used to join the shells 100, 102 together. Also depicted is a gapless seam 106 that may result from the shell 100 slightly overlapping the shell 102, or vice versa. In other embodiments, adhesives, bonding agents, and the like, may be used to secure the shells 100, 102 to each other.

Figure 12:
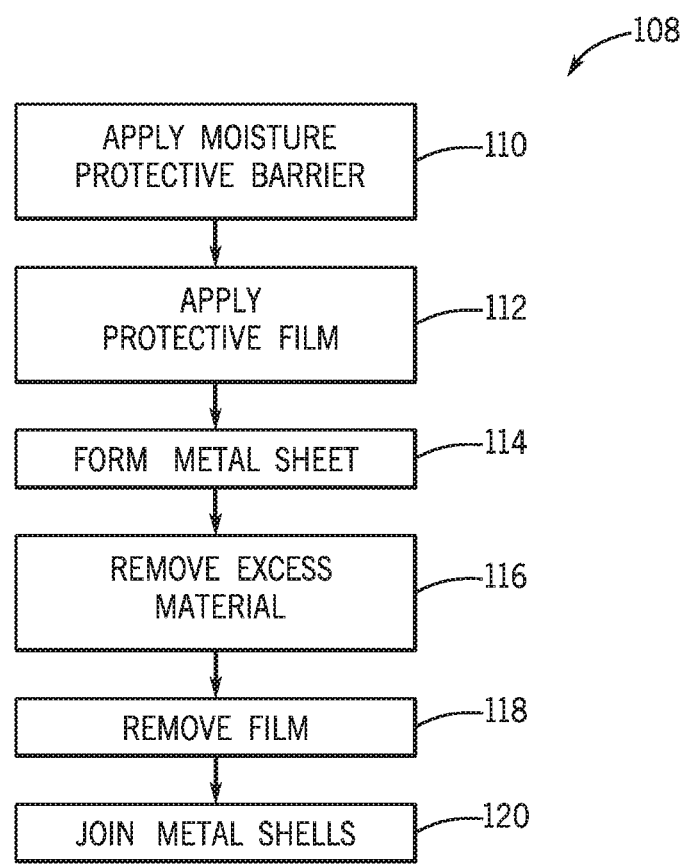
FIG. 12 is a flow chart of an embodiment of a process suitable for manufacturing insulation jackets.

FIG. 12 is a flow chart of an embodiment of a process 108 suitable for manufacturing the various jacket systems and components described above. The process 108 may be implemented by using computer instructions stored in a computer readable medium, such as a memory of a controller, and executable by the controller. In the depicted embodiment, the process 108 may first apply (block 110) a moisture protective barrier, such as a surlyn barrier (e.g., multilayer polysurlyn moisture barrier) to the interior surface 12 of the metal sheet 10 portions 36 and/or 38. The process 108 may then apply (block 112) the protective film 18 or 28 onto the outer surface 14 of the portions 36 and/or 38. The film 18 or 28 with the adhesive layer 20 may be press rolled or otherwise disposed onto the outer surface 14. As mentioned earlier, the protective films 18 and 28 may suitably protect the portions 36 and/or 38 from further marring during manufacturing. Accordingly, the portions 36 and/or 38 may be formed (block 114) into the shells 64, 66, 100, 102 by using, for example, the molds 40, 92.

The forming (block 114) into shells 64, 66, 100, 102 may include press or punch molding, for example, at forces of between approximately 0.25 and approximately 1 ton per square foot, or more. The films 18 and 28 may deform plastically during the forming operation (block 114), but may suitably protect the outer surface 14 from scratching or marring. Any excess material may then be removed (block 116), for example, by cutting. In one embodiment, the films 18 and 28 from the completed shells 64, 66, 100, 102 may then be removed. For example, by grasping a corner of the film 18 or 28 between the thumb and forefinger and pulling outwardly away from the outer surface 14. In another embodiment, the completed shells 64, 66, 100, 102 may be shipped with the films 18 and 28 included for further protection during shipping. The films 18 or 28 may then be removed (block 118) prior to installation of the shells 64, 66, 100, 102.

The process 108 may then join or assemble (block 120) the shells 64, 66, 100, 102 into corresponding angled jackets 84 and/or tee junctions 104. As mentioned above with respect to FIGS. 8 and 11, fasteners 86 and/or straps 88 may be used to join the shells 64, 66, 100, 102 to assemble the jackets 84, 104. The jackets 84, 104 may then insulate and protect underlying conduit joints, such as angled joints and tee-junction joints.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:
1. A system comprising:
 a protective jacket for insulating pipe, wherein the protective jacket comprises:
  a first metal shell comprising an interior surface and an exterior surface, wherein:
   the interior surface comprises a moisture protective coating;
   the moisture protective coating comprises at least one polyethylene layer and a polysurlyn layer;
   the exterior surface comprises a protective film adhered to the exterior surface by an adhesive;

the adhesive comprises a medium tack adhesive that provides for toolless removal of the protective film; and the first metal shell is produced by applying the protective film to the exterior surface before form pressing or punch molding the first metal shell into a shape configured to follow contours of the pipe.

2. The system of claim 1, wherein the first metal shell comprises a geometric shape having a fillet at a junction of one or more fingers.

3. The system of claim 1 wherein the first metal shell comprises an aluminum alloy, a stainless steel, a zinc, an aluzinc, a galvanized metal, or a combination thereof.

4. The system of claim 1, wherein the protective film comprises a polyethylene, a polypropylene, a plastic, a vinyl, a polymer, or a combination thereof.

5. The system of claim 1, wherein the adhesive comprises an acrylic adhesive, a water-based adhesive, a medium-tack adhesive, or a combination thereof, having an adhesive force suitable for hand removal of the film.

6. The system of claim 1, wherein the first metal shell comprises a first finger formed at least about 0.5 inches from a second finger to accommodate banding.

7. The system of claim 1, comprising a second metal shell having substantially similar dimensions as the first metal shell, wherein the protective jacket comprises the first and the second metal shells fastened to each other.

8. The system of claim 7, comprising a strap fastening the first metal shell to the second metal shell.

9. The system of claim 1, wherein the protective jacket comprises an angled jacket, a tee-junction jacket, or a combination thereof.

10. A method for manufacturing a protective jacket for insulating pipe, the method comprising:

manufacturing a first metal shell, wherein manufacturing the first metal shell comprises:

applying a moisture protective coating to a first surface of a metal sheet, the moisture protective coating comprising at least one polyethylene layer and a polysurlyn layer;

applying a protective film to a second surface of the metal sheet using an adhesive, wherein the adhesive comprises a medium tack adhesive that provides for toolless removal of the protective film; and after first applying the protective film to the second surface, then form pressing or punch molding the metal sheet into a shape configured to follow contours of the pipe.

11. The method of claim 10, wherein forming the metal sheet comprises disposing the metal sheet between a male mold having the shape and a female mold conforming to the male mold, and applying a pressure suitable to insert the male mold into the female mold.

12. The method of claim 10, comprising manually removing the protective film before shipping the first metal shell, or manually removing the protective film after shipping the first metal shell.

13. The method of claim 10, wherein forming the metal sheet comprises forming the metal sheet into an elbow joint shape having an angle of between approximately 45° and approximately 150°, or forming the metal sheet into a tee-junction shape.

14. The method of claim 10, comprising manufacturing a second metal shell having a substantially similar geometry as the first metal shell, and joining the first and second metal shells together.

15. The method of claim 14, wherein the first and second metal shells overlap at a seam.

16. The method of claim 10, wherein the protective film comprises a polyethylene, a polypropylene, a plastic, a vinyl, a polymer, or a combination thereof, and the adhesive comprises an acrylic adhesive, a water-based adhesive, a medium-tack adhesive, or a combination thereof.

17. A method for manufacturing a protective jacket for insulating pipe, the method comprising:

manufacturing a metal shell, wherein manufacturing the metal shell comprises:

applying a moisture protective coating to a first surface of a metal sheet;

applying a protective film to a second surface of the metal sheet using an adhesive, wherein:

the adhesive comprises a medium tack adhesive that provides for toolless removal of the protective film; and the moisture protective coating comprises at least one polyethylene layer and a polysurlyn layer; and after first applying the protective film to the second surface, then using a male mold and a female mold to form press or to punch mold the metal sheet into a shape configured to follow contours of the pipe by press or punch molding.

18. The method of claim 17, comprising manually removing the protective film before shipping the metal shell, or manually removing the film after shipping the metal shell.

19. The method of claim 17, wherein the protective film comprises a polyethylene, a polypropylene, a plastic, a vinyl, a polymer, or a combination thereof, and the adhesive comprises an acrylic adhesive, a water-based adhesive, a medium-tack adhesive, or a combination thereof.

20. The system of claim 1, wherein the protective film is adhered immediately adjacent to the metal jacket.

21. The system of claim 1, wherein the at least one polyethylene layer comprises a low density polyethylene layer positioned proximate the first metal shell and a high density polyethylene layer positioned atop the low density polyethylene layer, and wherein the polysurlyn layer is disposed between the low density polyethylene layer and the high density polyethylene layer.

* * * * *